United States Patent [19]
Beernink et al.

[11] Patent Number: 5,434,929
[45] Date of Patent: Jul. 18, 1995

[54] METHOD AND APPARATUS FOR SETTING CHARACTER STYLE PREFERENCES IN A PEN-BASED COMPUTER SYSTEM

[75] Inventors: Ernest H. Beernink, San Carlos, Calif.; Donna M. Auguste, Lyons, Colo.; Eugeny Chechetkin, Cupertino, Calif.

[73] Assignee: Apple Computer, Inc., Cupertino, Calif.

[21] Appl. No.: 274,295

[22] Filed: Jul. 12, 1994

[51] Int. Cl.⁶ ............................................... G06K 9/00
[52] U.S. Cl. .................................. 382/187; 382/228; 382/309
[58] Field of Search .................. 382/13, 39, 57, 59, 382/3, 14

[56] References Cited

U.S. PATENT DOCUMENTS

| | | | |
|---|---|---|---|
| 5,191,622 | 3/1993 | Shojima et al. | 382/13 |
| 5,257,074 | 10/1993 | Kamei | 382/13 |
| 5,315,667 | 5/1994 | Fujisaki et al. | 382/13 |
| 5,315,668 | 5/1994 | O'Hair | 382/14 |

*Primary Examiner*—Leo H. Boudreau
*Attorney, Agent, or Firm*—Hickman & Beyer

[57] ABSTRACT

In one method for setting character style preferences according to the present invention, a character style preference area is initially activated. Then, a plurality of variant character styles are displayed for a selected character with each character style representing a distinct way of writing the selected character that is recognized by the system recognizer. Inputs are then received, which indicate and set the probability that an input character style will be in a form similar to the selected character style. Other inputs include the selection of a different character for display, selection of a variant character style from the displayed area, selection of a reset command, and selection of a probability weight for a selected variant. The method further includes the slow redrawing of a selected variant within a selected variant group to demonstrate to the user the input strokes forming the selected variant. A computer system for performing the methods in accordance with the present invention is also described. The apparatus includes the mechanisms for activating a character style preference editor and for drawing a plurality of variant character styles. Also included is a mechanism for setting a use probability factor that is to be associated with the selected character style. Further included are the mechanisms for determining the selection of a probability level for the character styles and for shading the character styles appropriately to reflect the selected probability levels.

30 Claims, 9 Drawing Sheets

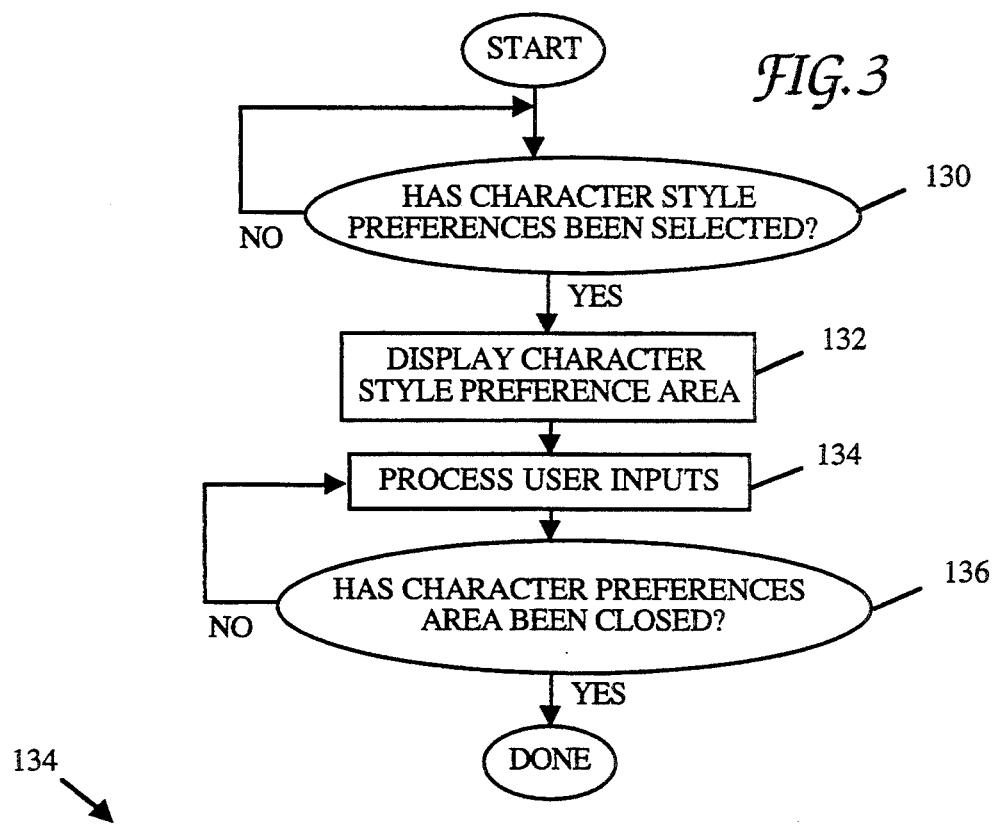
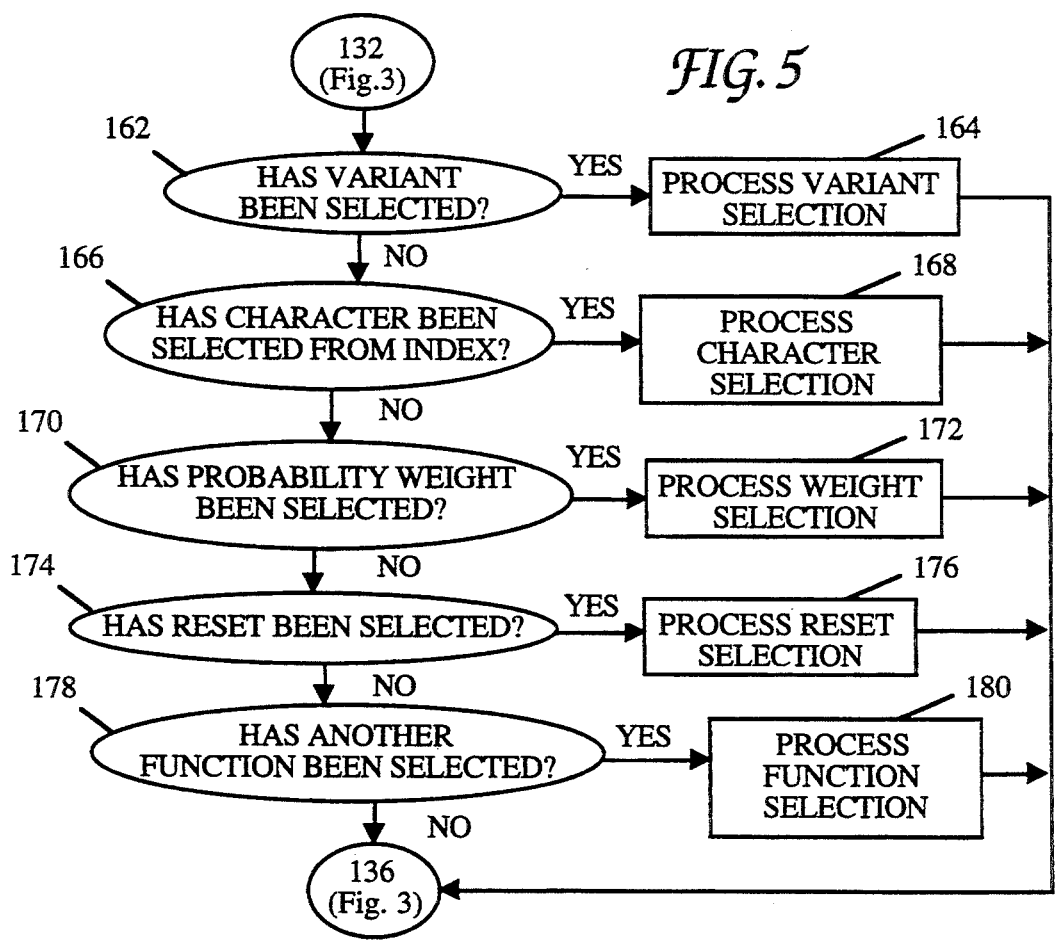

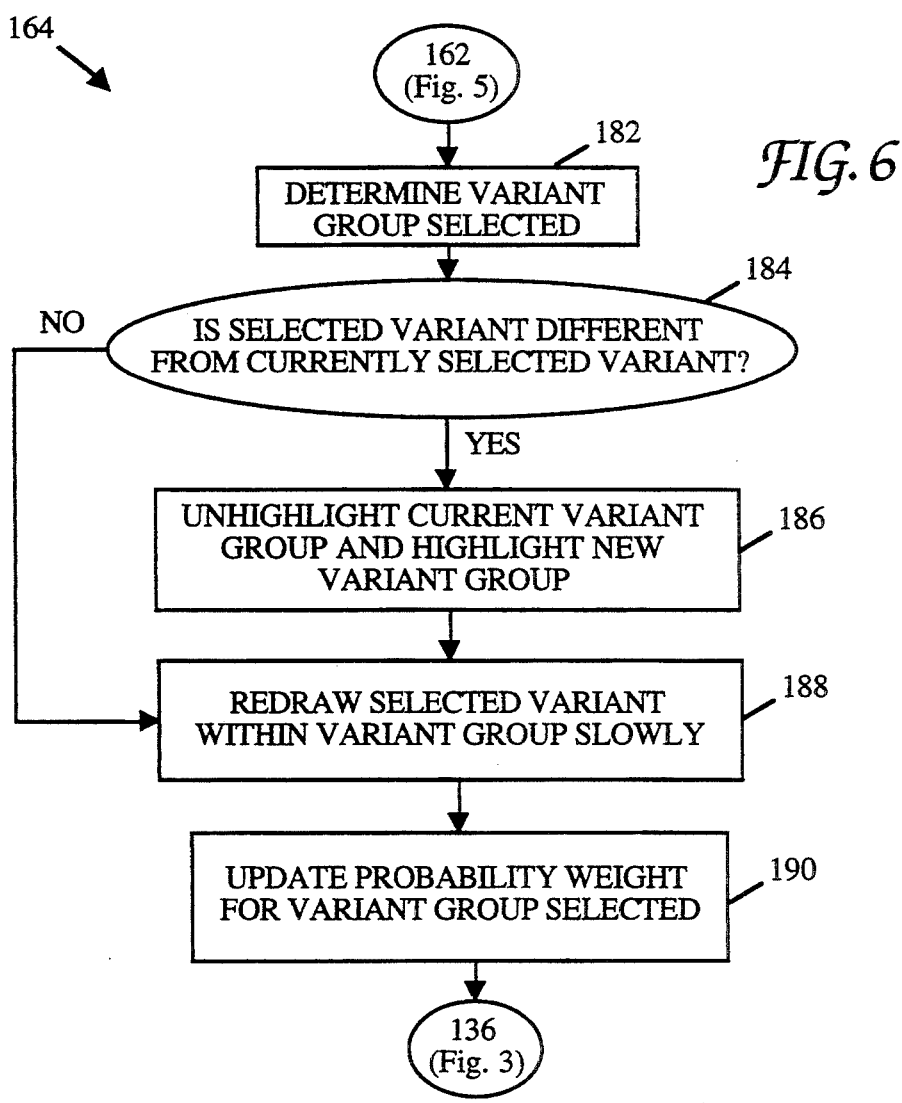

METHOD AND APPARATUS FOR SETTING CHARACTER STYLE PREFERENCES IN A PEN-BASED COMPUTER SYSTEM

BACKGROUND OF THE INVENTION

The present invention relates generally to computer systems, and more particularly to text recognition in pen-based computer systems.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of combining the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

The recognition of pen inputs as text and numeric characters is performed by suitable recognition system routines. The ability to properly recognize a user's inputs is vital to the practicality and versatility of pen-based systems. A system's continual misinterpretation of inputs is frustrating and discouraging to users. To help overcome this, system designers have developed recognition systems that "learn" to interpret a user's inputs properly through repeated use, i.e., the recognizer is better able to distinguish inputs as characters the more the user uses the system. An enhancement to such a system is customization by the user to indicate to the system which inputs are likely to occur as specific characters. Such customization "trains" the system to recognize characters more accurately and quickly.

SUMMARY OF THE INVENTION

In accordance with the purpose of the present invention, a method and apparatus for user selection of character style preferences in a pen-based computer system is described. In this way, a user establishes their preferred style of writing with the system recognizer.

In a method for setting character style preferences aspect of the invention, the method begins when a character style preference area is initially activated. Then, a plurality of variant character styles are displayed for a selected character with each character style representing a distinct way of writing the selected character that is recognized by the system recognizer. Inputs are then received, which indicate and set the probability that an input character style will be in a form similar to the selected character style. Other inputs include the selection of a different character for display, selection of a variant character style from the displayed area, selection of a reset command, and selection of a probability weight for a selected variant. The method further includes the slow redrawing of a selected variant within a selected variant group to demonstrate to the user the input strokes forming the selected variant. In this way, the user is better able to determine whether a particular variant represented by the recognizer resembles their own character input.

A computer system for performing the methods in accordance with the present invention is also described. The apparatus includes the mechanisms for activating a character style preference editor and for drawing a plurality of variant character styles. Each character style represents a distinct style of writing a selected character that a system recognizer recognizes. Also included is a mechanism for setting a use probability factor that is to be associated with the selected character style that is utilized by the system recognizer in discerning handwritten inputs. Further included are the mechanisms for determining the selection of a probability level for the character styles and for shading the character styles appropriately to reflect the selected probability levels.

By the methods and apparatus of the present invention, proper recognition of character input is increased. The user also has a greater sense of control over the system's interpretation of inputs by allowing the user to set the probability level for the occurrence of specific character styles. In turn, the system also is better able to distinguish an input as a specific character by knowing the user's most likely intended input among a plurality of possible interpretations. This helps create a more practical and realistic system.

These and other advantages of the present invention will become apparent upon reading the following detailed descriptions and studying the various figures of the drawings.

BRIEF DESCRIPTION OF THE DRAWINGS

FIG. 3 is a flow diagram illustrating the steps in an overall process of setting character style preferences in accordance with the present invention;

FIG. 5 is a flow diagram illustrating a set of steps for processing user inputs to the character style preference area (step 134 of FIG. 3);

FIG. 6 is a flow diagram illustrating the processing of a variant selection (step 164 of FIG. 5);

DETAILED DESCRIPTION OF THE PREFERRED EMBODIMENTS

The present invention is well suited for pointer based computer systems such as the pen-based, and pen-aware systems that are currently popular. For the purposes of illustration, the invention will be described in connection with a pen-based system.

Figure 1:
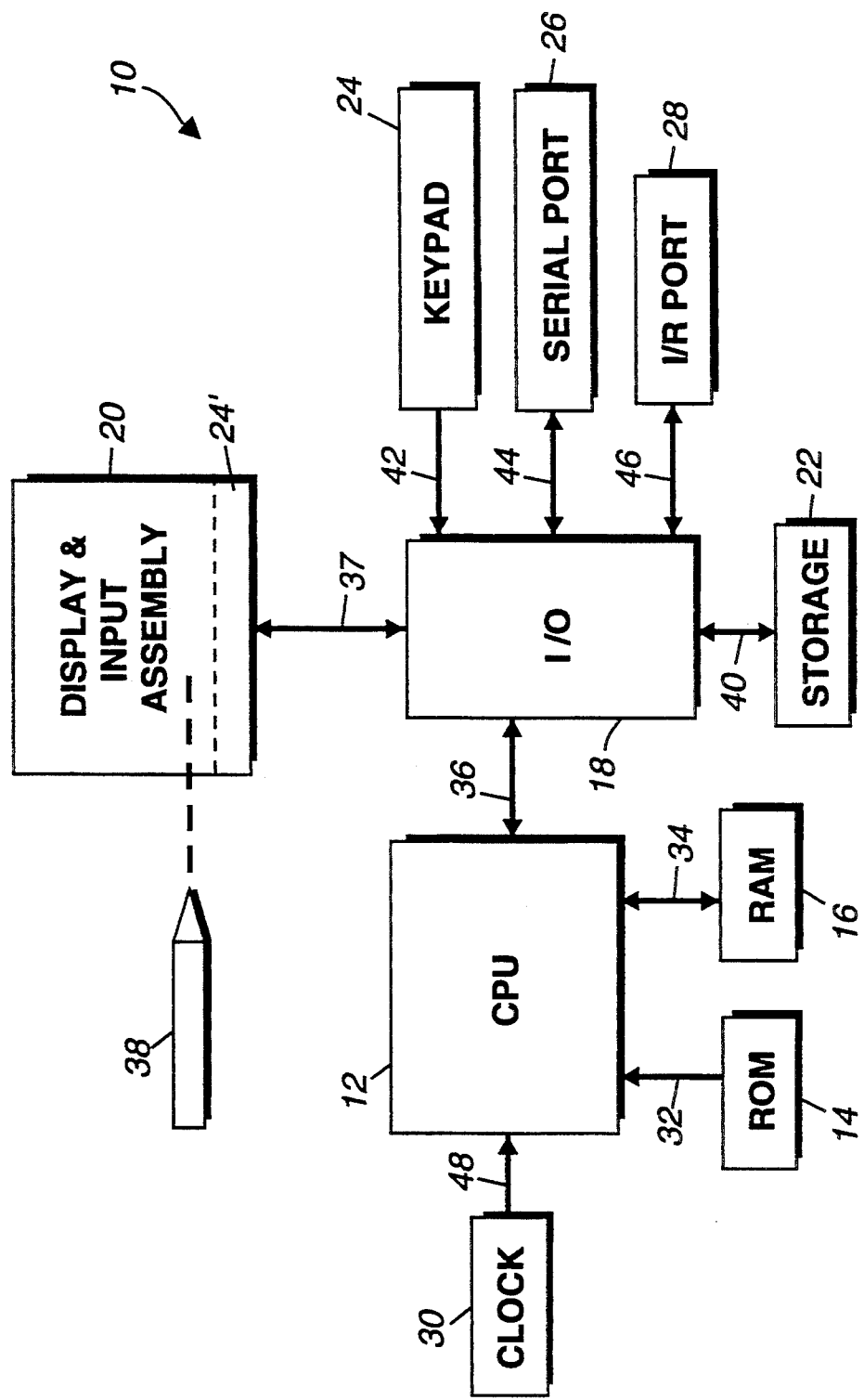
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input-/output (I/O) circuitry 18, and á display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bidirectional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2A:
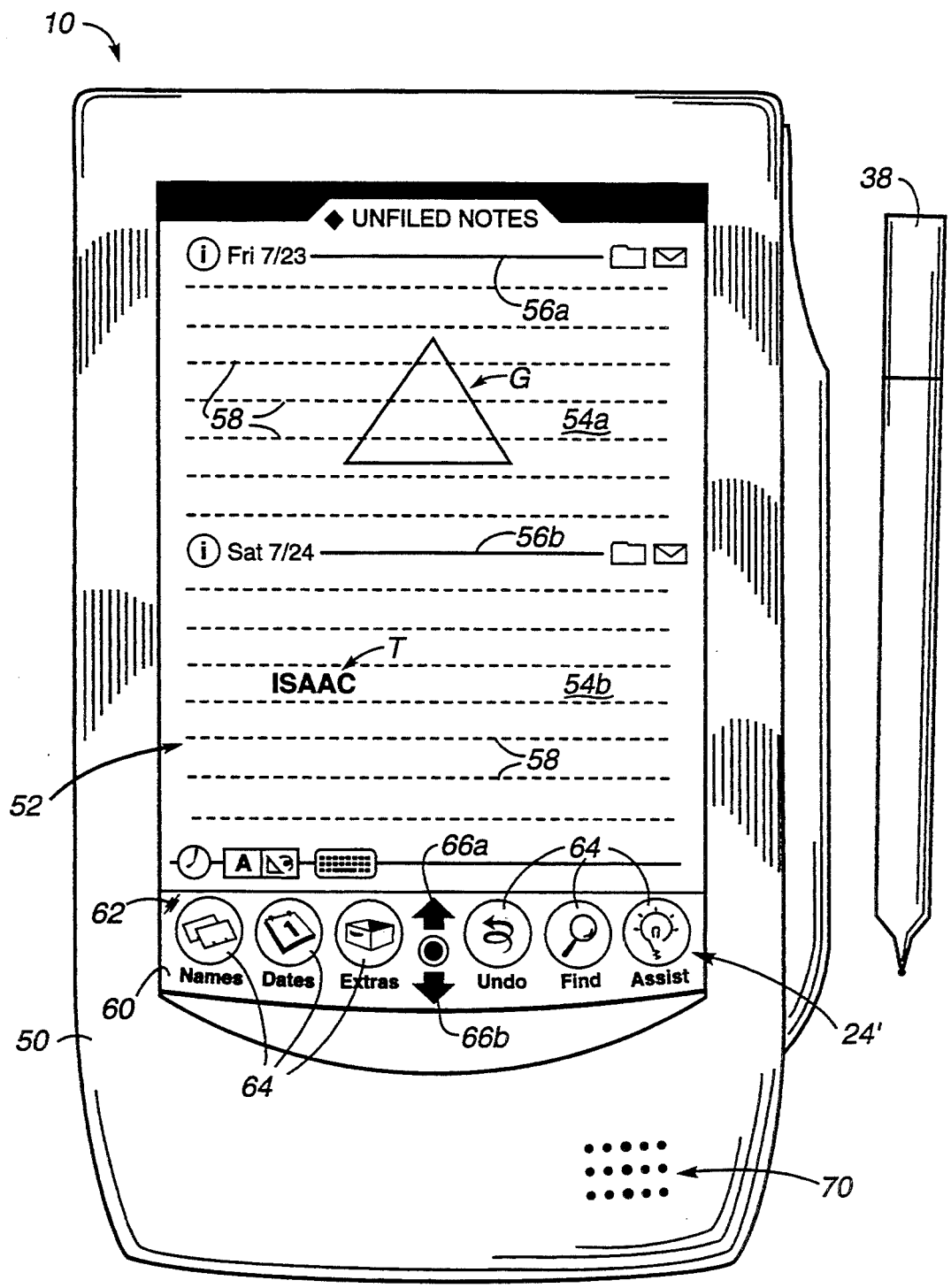
FIG. 2a is a top plan view of the screen, case, keypad, and stylus of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2a.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2a, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2a is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in co-pending U.S. patent application Ser. No. 07/976,970, which has been incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

Figure 2B:
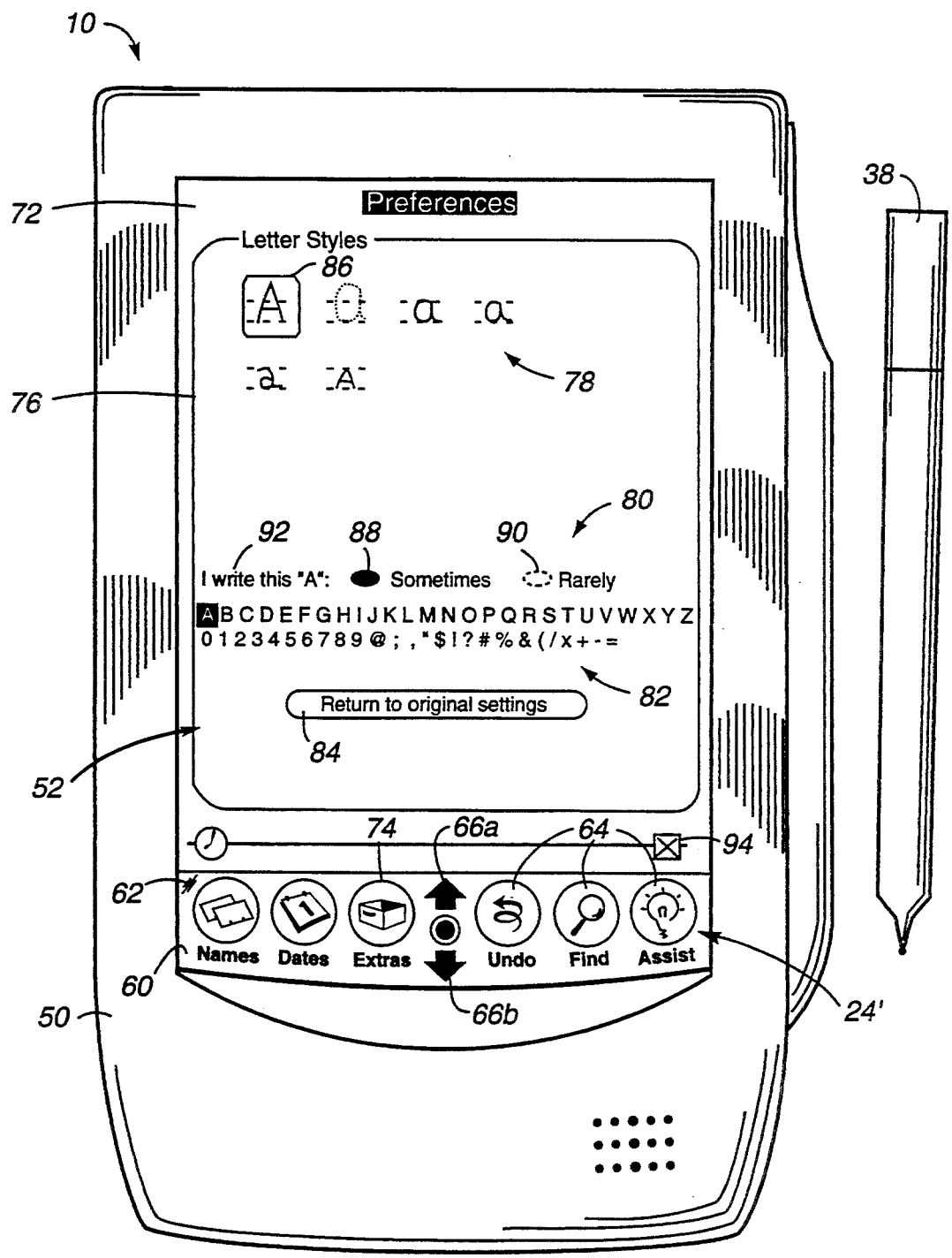
FIG. 2b is an illustration of the computer system of FIG. 2a with a representative character style preferences window open.

In FIG. 2b, the screen 52 of FIG. 2a is illustrated with an open preferences window 72. This window is activated, for example, by first selecting the Extras button 74 of the pseudo keypad 24' to open a pop-up window of command icons and then subsequently selecting a Preferences icon (not shown). A preference setting area is then opened by selecting a preferred item from a displayed list, such as a character style preference listing to open character style preference area 76. Selection in these instances refers to "tapping" the button, icon, or menu listing. A tap gesture involves placing the stylus 38 on the screen 52 for a short, predetermined length of time and then lifting the stylus without moving the stylus a significant amount. By way of example, placing the stylus on the screen for a period of less than in the range of one twentieth to one seconds may be appropriate, with one third of a second being an appropriate maximum hold period. Also, to qualify as a tap gesture, the stylus must not have been moved more than an insignificant distance across the screen. By way of example, movement of more than in the range of two to ten pixels may be considered enough to disqualify an input from being a tap gesture when the display screen has a resolution of approximately 80 pixels per inch. For example, a maximum movement of six pixels has been found to work well.

The character style preference area 76 includes a recognized character style area 78, a probability selection area 80, a character index area 82, and a control bar area 84. Upon opening of the character style preference area 76, a default selection of the character "a" is chosen for display. Of course, in alternate embodiments, other characters could also be chosen to be the default character displayed, such as the last character displayed when the character style preference area was last active. As shown, the recognized character style area 78 includes the character style variant groups that are recognized by the chosen recognition system as an input of the character "a". An appropriate recognition system is described in co-pending U.S. patent application Ser. No. 08/068,443, filed May 27, 1993 on behalf of Beernink, and entitled "Method and Apparatus for Recognizing Handwritten Words", the disclosure of which is hereby incorporated in its entirety. A first variant group 86 is shown highlighted, e.g., with a surrounding solid box, and represents one set of strokes recognized as a capital "A". The probability that that particular letter style is going to be input by the user is indicated both by the shading of the variant group and by the probability selection area 80. The selection of the "sometimes" button 88 indicates that that variant is expected to be written more frequently by the user, which is reflected by the dark, solid shading of the variant group 86. Alternatively, the rarely button 90 could be selected, which would indicate that that variant is expected to be written infrequently or not at all and would lighten the shading of the variant group. Selection of the rarely button 90 is illustrated and explained in greater detail with reference to FIG. 2c. Of course in alternate embodiments, other probability levels could also be included, such as a higher level of "always" or a lower level of "never", to have more indicator levels for each variant group. An appropriate shading scheme, e.g., a thicker, darker shading for higher levels and lighter shading for lower levels, may be used to visually indicate to the user the probability associated with each variant group.

In addition to the selection of a probability level for each character style variant group, each character within a character style variant group is selectable. The selection of an individual character, by way of tapping on the character, for example, causes that character to be redrawn on the screen at a slow speed discernible to the user. This provides direct feedback to the user on the manner and form of the strokes comprising the particular character. In this way, the user receives a more accurate indication of the differences between the character styles and also allows the user to more accurately associate a probability level with each particular character style.

The character index area 82 has a listing of characters which allows a user to select a different character so that its associated variant groups are displayed. In some instances, due to size constraints of the display, certain characters are not explicitly listed but their variant groups are included with the display of other similar characters listed in the index, which is illustrated and described in more detail with reference to FIG. 2d. The character selected in the index is indicated, for example, by the reverse highlighting of the letter, e.g., white lettering on a black background. Selection is again suitably performed by tapping on the desired character. A character selection from the character index is also reflected by the updating of the probability selection area 80, so that the string 92 contains the proper character, which, for the default case illustrated, is the character "A".

Positioned below the character index area 82 is the control bar area 84, which contains a button for resetting the probability levels of all the character styles to their default values. A confirmed selection of the reset button eliminates all of the "training" the recognizer has achieved, so that the settings must then be set to their preferred level through individual selection or over time through continued use of the system recognizer. This "training" refers to the chosen recognizer's ability to properly interpret a user's inputs by "learning" the user's writing style. The present invention supplements this learning by allowing a user to indicate which type of writing style they are likely to use. In this way, the recognizer is trained faster and is more accurate. Resetting of the character styles returns the recognizer to its original, "untrained" state. The processing of a reset button selection is described in greater detail with reference to FIG. 9. In addition to this reset button, the character style preference area also includes a close box 94 that allows a user to quit a session of setting preferences by simply selecting, i.e., "tapping", on the close box 94.

Figure 2D:
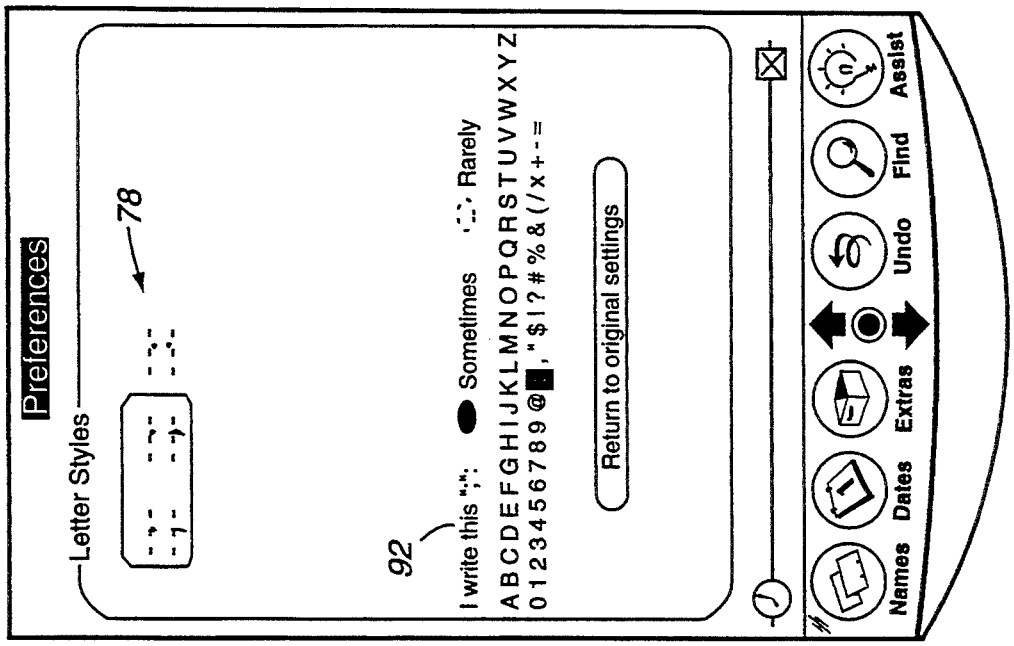
FIG. 2d illustrates the screen display of FIG. 2b after the selection of a different character from the character index.
Figure 2C:
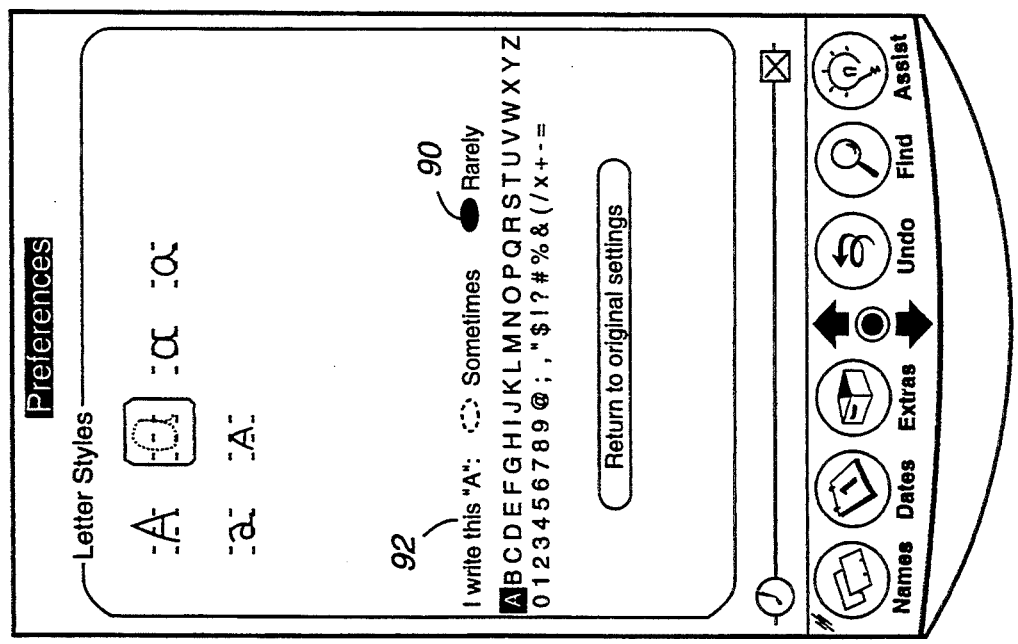
FIG. 2c illustrates the screen display of FIG. 2b after the selection of a different variant group.

FIG. 2c illustrates the change in the appearance of the screen of FIG. 2b when a different variant group is selected. In this figure, the second variant group having a cursive "A" has been selected, so that it is shown highlighted. The selection of this second variant group is achieved by a suitable selection technique, with "tapping" on the variant group being sufficient. This selection of a variant group also causes the variant selected to be redrawn slowly, which allows the user to see what type of input strokes comprise the displayed variant. In this way, a user discerns whether a variant that appears similar to their type of writing style actually is composed of a similar set of input strokes, thus creating a more accurate probability indication. For the cursive "A" shown, the probability selected is "rarely", and thus, the character is lightly shaded to visually indicate that the probability of that character style being input is low. The character index still shows that the character "A" is the selected character by reverse highlighting, and the string 92 has not been changed since "a" is still the character being displayed. The steps involved in processing the selection of a variant group are presented in greater detail in the discussion of FIG. 6.

FIG. 2d illustrates the character style preference area of FIG. 2b with the selection of the ";" character from the character index. Again, the character ";" is reverse highlighted in the character index, while the string 92 is updated to contain a ";", and a box is placed around the selected variant group to highlight it. In this case, there are two shapes that the recognizer interprets as a ";". Although they have a slightly different appearance to the user, these shapes are not distinguished as separate inputs by the recognizer and are therefore put into the same variant group. However, each variant in the variant group is selectable to be redrawn slowly so that the actual input strokes for each are viewable even though they are in the same grouping. Other examples of possible characters having multivariant variant group combinations include variations of the character "c", the character "l", and the character "b". When variants are combined in one group, they all receive the same probability setting selected. In the case shown, there is only one variant group for the ";" to be set, so it is only able to be set to a "sometimes" level of probability. By restricting all variations of the same character style from being set to "rarely", each variant group maintains a probability of occurring. Similarly, all variant groups of the same character style, such as all variants of a capital "A", are preferably restricted from being set to "rarely", again since each recognizable character style must be able to occur at some time. Of course, for alternate embodiments having more than two probability settings, the restrictions on the probability settings are reduced, but the principle of restricting all the variant groups of a single character style from being set to the lowest probability setting would be maintained.

The variant group for the character ":" is also shown as part of the recognized character style area 78. The two sets of variant groups, ";" and ":", are displayed at the same time but are combined under one character (";") in the index. They are similar in shape and use, so that by placing them under one character listing, index space is efficiently utilized. Other examples of possible variant group combinations are the grouping of the "," and "." variant groups under the "," index listing and the combining of the single quote (') and double quote (") under the single quote index listing. This allows the user to select preferences for more character styles than are actually displayed in the index.

Turning now to the processing for character style preference selection, the flow diagram of FIG. 3 presents the steps in the overall process for performing the functions described. The process begins in step 130 with a determination of whether the character style preferences command has been selected. Again, a suitable selection method involves selecting the preferences command icon from a pop-up window resulting from the selection of the Extras button, and then the selection of the character style preference listing, as described previously. When selection is detected, the process continues with step 132, and the character style preference area, e.g., the screen shot of FIG. 2b, is displayed. A method for achieving this arrangement is described in further detail with reference to FIG. 4. Following the display of the character preference area, user inputs to the system are then processed in step 134. Such inputs include selecting a variant group, selecting a probability level, and selecting a character from the character index, as presented in the description of FIGS. 2c-d. Details of the processing for these and other inputs are further described with reference to FIG. 5. Inputs are processed until the logic determines in step 136 that an input has been made to quit the character style preference area. As mentioned previously, a selection of the close box is a suitable method of ending the character style preference process. Once the determination is made that the character style preference area is deactivated, the process is completed.

Figure 4:
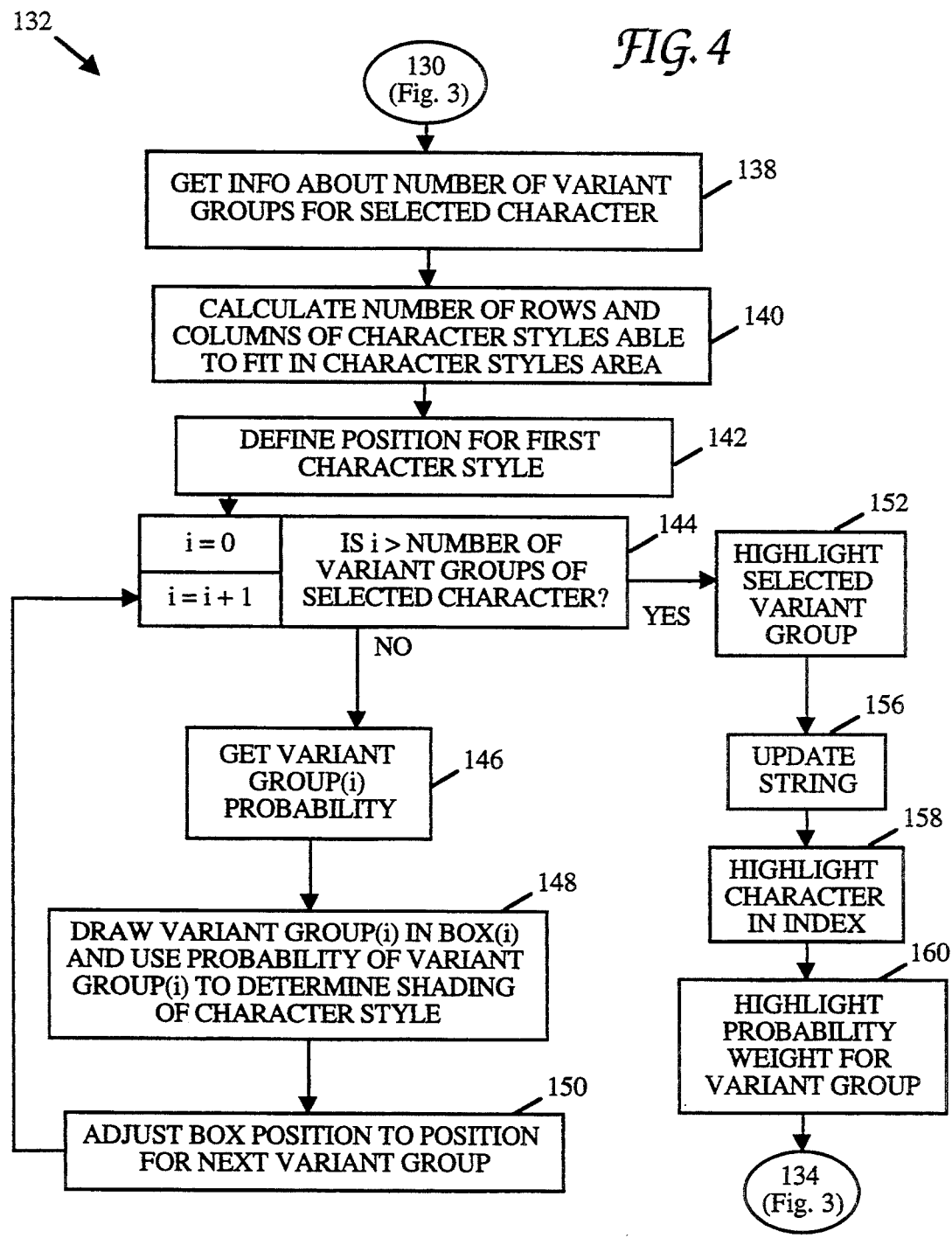
FIG. 4 is a flow diagram illustrating a process for displaying the character style preference area (step 132 of FIG. 3)

The process for displaying the character style preference area (step 132 of FIG. 3) is presented in the flow diagram of FIG. 4. The process begins by obtaining the number of variant groups for a selected character. In the initial case, a default character choice such as the letter "a" is made, but, of course, alternate default character selections are possible. The logic continues with step 140 with the calculation of the number of rows and columns within the character style preference area that are capable of containing a character style. The total area of the recognizable character style area is divided into a number of smaller areas or boxes of a predetermined size to contain the character styles. The size of the boxes are based on a chosen character height and width. For example, an area or box approximately 44 pixels high and 44 pixels wide, has been found to work well for a screen approximately 240 pixels wide. A first position for placing a first character style is designated in step 142. An iterative loop is then begun in step 144 with the initialization of the loop counter "i" to zero. The number of variant groups is then compared to the current count as indicated by the status of "i". While "i" is less than number of variant groups, the logic continues with step 146 in which the probability for the current variant group is obtained. The variant group is then displayed in step 148 in the current designated variant group location and with a shading corresponding to the probability level associated with that variant group. The position for placing the next variant group is then identified in step 150 before the logic returns to update the "i" count. For the case of more than one character style being placed into a single variant group, each variant within the variant group requires one box location, so that more than one box location is used. If the variant group size, i.e., one box for one variant, two boxes for two variants, etc., and the column location for placing the group exceed the number of columns for the row, then the variant group is placed on the next row. Of course, in a preferred embodiment, the locations for placement do not extend beyond the visible area of the recognizable character area.

Once all the variant groups have been located and displayed, the process continues with step 152 in which the selected variant group is highlighted. In the default case, the first variant group is highlighted, e.g., has a box drawn around it, as illustrated in FIG. 2b. The string (92 of FIG. 2b) associated with the probability level indicators is then updated in step 156 to indicate the selected character. The selected character is further indicated in the character index by reverse highlighting of the character in step 158. The indicator associated with the designated probability weight for the selected variant group is then highlighted in step 160 before the logic returns to step 134 with the processing of user inputs. Although steps 152 to 160 have been illustrated as sequential steps in FIG. 4, they are in no way restricted to this order, and in fact, they preferably occur substantially simultaneously, so they appear to a user as occurring all at once.

The overall method involved in the processing of user inputs into the character style user interface (step 134 of FIG. 3) is illustrated in the flow diagram presented in FIG. 5. The process begins by determining whether a variant has been selected (see FIG. 2c). If so, the selection is processed in step 164, the details of which are presented with reference to FIG. 6. If not, the process continues with step 166 to determine whether a character has been selected in the character index (e.g., FIG. 2d). Such a selection is processed in step 168 which is detailed in FIG. 7. If this selection has not been made, the next determination in step 170 is the selection of a probability weight. When a probability weight has been selected, the logic continues with step 172 and the processing of the selection. The steps involved in this processing are presented in FIG. 8. If no probability has been selected, the process continues with step 174 to determine if the reset command button has been selected. A reset selection is processed in step 176 upon a positive determination, which is illustrated in the flow diagram of FIG. 9. Upon a negative determination of step 174, step 178 determines if another function has been selected. These include selection of one of the scroll arrows, or another of the command buttons in the keypad 24', and/or an inadvertent engagement of the stylus on another part of the screen. Such function selection is then processed in step 180 by processes outside of the character style preference processing, such as that described in the aforementioned, incorporated co-pending U.S. patent application Ser. No. 07/868,013. Upon completion of the proper processing, the logic returns to step 136 to determine if the character style preference processing has been closed.

In the foregoing explanation the process has been described as if the checking steps 162, 166, 170, 174, and 178 are serially executed. However, as will be appreciated by those skilled in the art, in practice such a checking algorithm is not specifically required. Rather, in practice, the various described functions (i.e. steps 162–164, 166–168, 170–172, 174–176, and 178–180) are call routines which are executed when called. To call the functions, the reviewer can select the associated button, icon, etc. in the feedback interface. Alternatively, they could be called by selecting a menu item in a pull down menu, by keyboard commands or in any other suitable manner.

FIG. 6 illustrates the processing of a variant selection (step 164 of FIG. 5). The logic begins with the determination of the variant group selected in step 182. This view system provides such information by determining where on the screen the selection occurred. The logic determines which variant group corresponds to this location, and in step 184, determines whether this variant group is different from a currently selected variant group. If so, the newly selected variant group is shown highlighted, e.g., with a box around it, and the currently selected group is unhighlighted, i.e., by removing the box surrounding it. If the selected variant group is the same as the currently selected variant group, then there is no need to perform any new highlighting since the currently selected variant group is already highlighted. The logic continues with the redrawing of the selected variant within the selected variant group slowly in step 188. This step allows the user to see the input strokes that comprise the selected variant. In this way, the user has direct feedback on how the system interprets certain inputs. Also, the user is better able to discern if a variant that may appear similar to their style of writing is actually the same or different based on the strokes displayed when the variant is redrawn. The probability weight for the selected variant group is then updated in step 190 before the logic returns to step 136.

Figure 7:
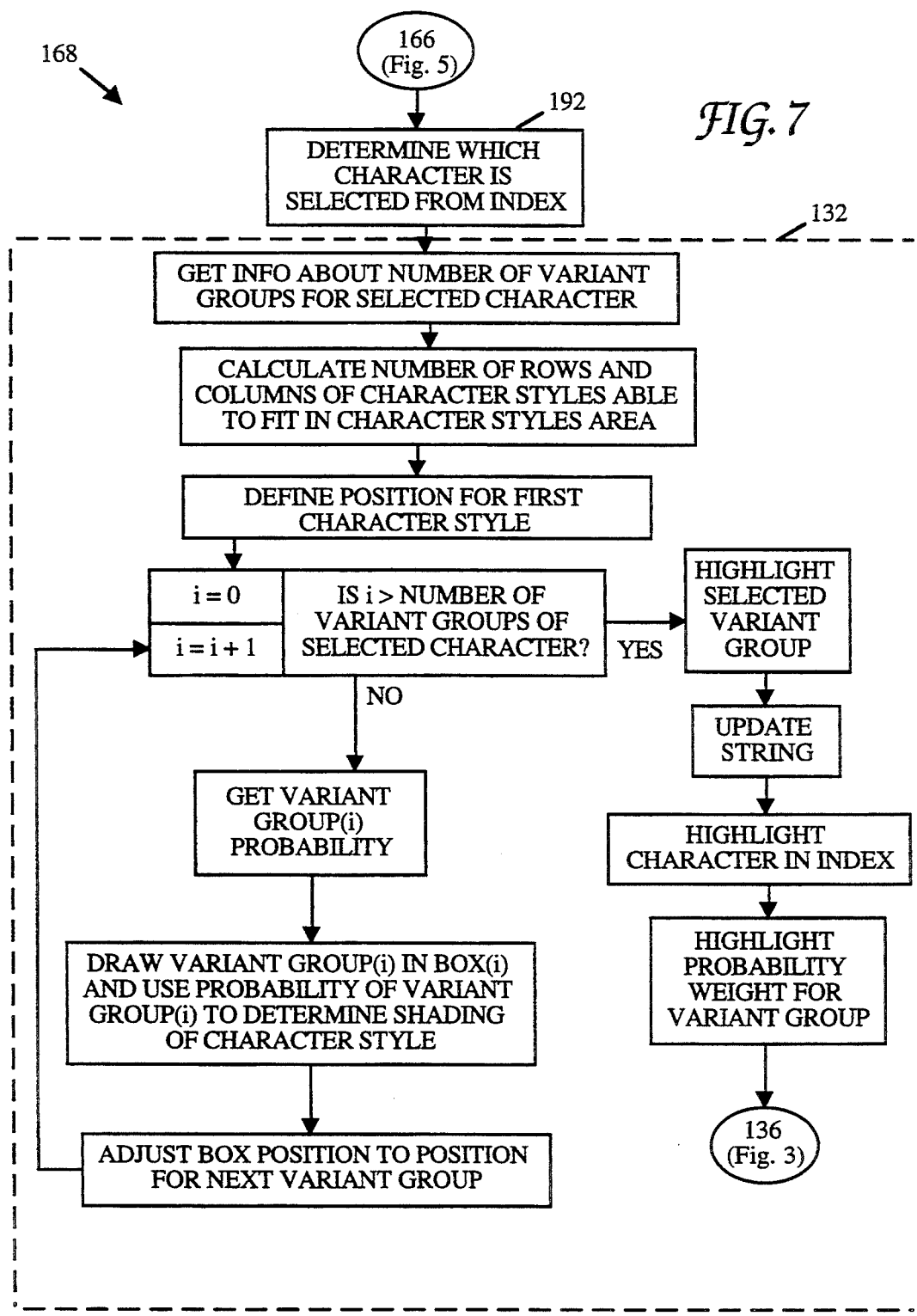
FIG. 7 is a flow diagram illustrating a process for selection of a character from the character index (step 168 of FIG. 5)

The logic for processing a character selection from the character index (step 168 of FIG. 5) is presented in the flow diagram of FIG. 7. The logic begins in step 192 with the determination of which character has been selected from the character index. Again, this is based on the location of a tap over the index area. Once the character is determined, the logic continues in the same way as when the character style preference area is first opened, as described with reference to FIG. 4. Therefore, following step 192, the remaining process steps are equivalent to the logic for step 132, which is represented in the flow diagram of FIG. 4. Thus, upon completion of the placement of all the variant groups for the newly selected character into the recognizable character style area, all the character styles for the newly chosen character are displayed. The logic then returns to step 136 to determine whether the preference style area has been closed.

Figure 8:
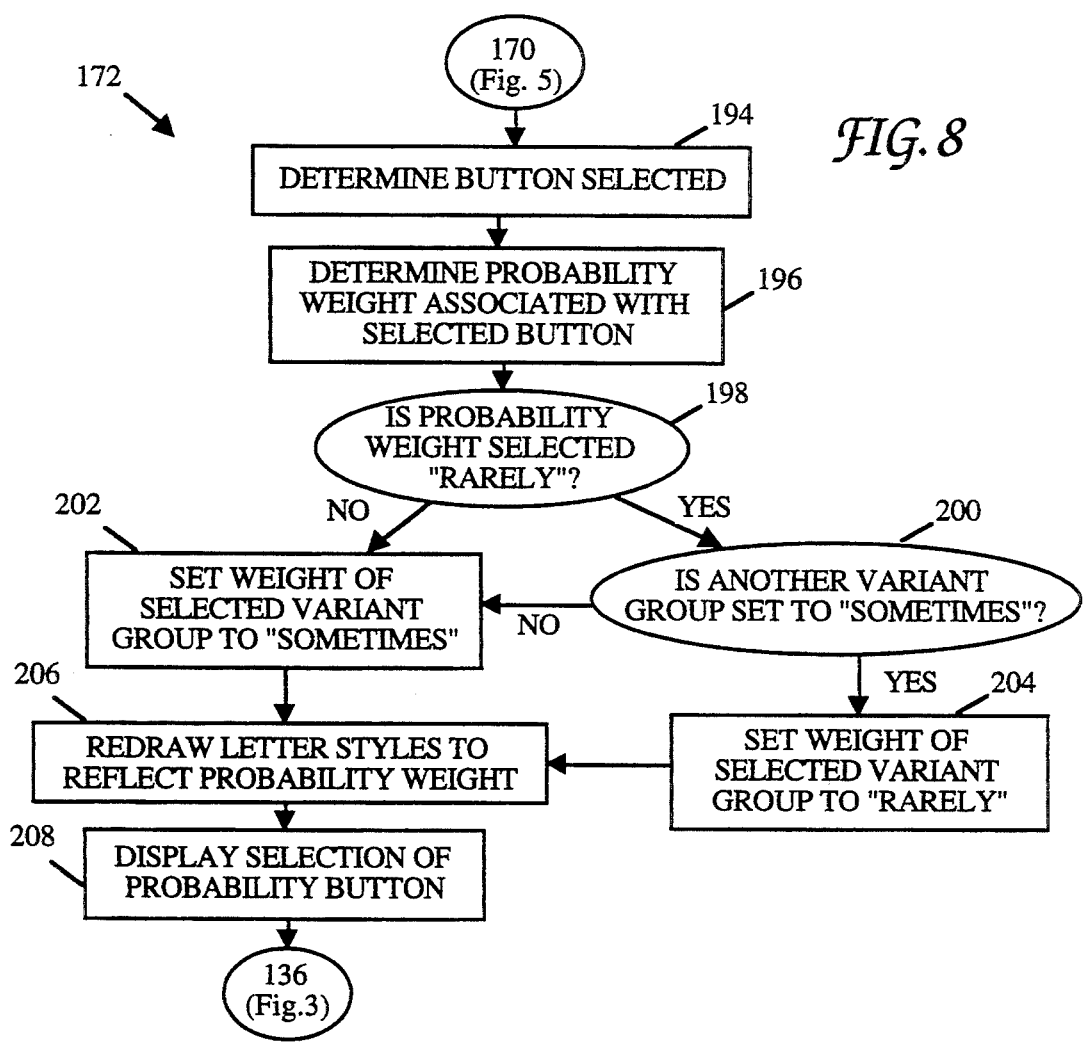
FIG. 8 is a flow diagram illustrating a set of steps for the processing of a probability weight selection (step 172 of FIG. 5)

FIG. 8 presents the logic for processing a probability weight selection (step 172 of FIG. 5). The logic begins in step 194 with the determination of the probability button chosen. The probability associated with the button is then determined in step 196. If the weight selected is equivalent to the weight associated with the "rarely"

button, as determined by step 198, the logic continues with step 200 to determine whether another variant group for the displayed character is set to a weight equivalent to the "sometimes" level of probability. If not, the selected variant is restricted from being set to "rarely" and is instead set to "sometimes" in step 202, so that there remains a possibility that the character style will occur. Step 202 is also performed if step 198 determines that the "rarely" level of probability has not been selected. If there is another variant group for that character style already set to "sometimes", then there is an already established possibility for that character style to occur, so the process continues with the setting of the selected variant group to the "rarely" probability weight in step 204. Following the setting of the selected variant group in either step 202 or 204, the logic proceeds with step 206 and the redrawing of the selected variant group to reflect the probability weight by adjusting the level of shading associated with the variant group (illustrated in FIGS. 2b and 2c). Once step 206 is completed, the probability button associated with probability weight is highlighted in step 208 before the process returns to step 136 for the determination of whether the preference setting session has been ended.

Figure 9:
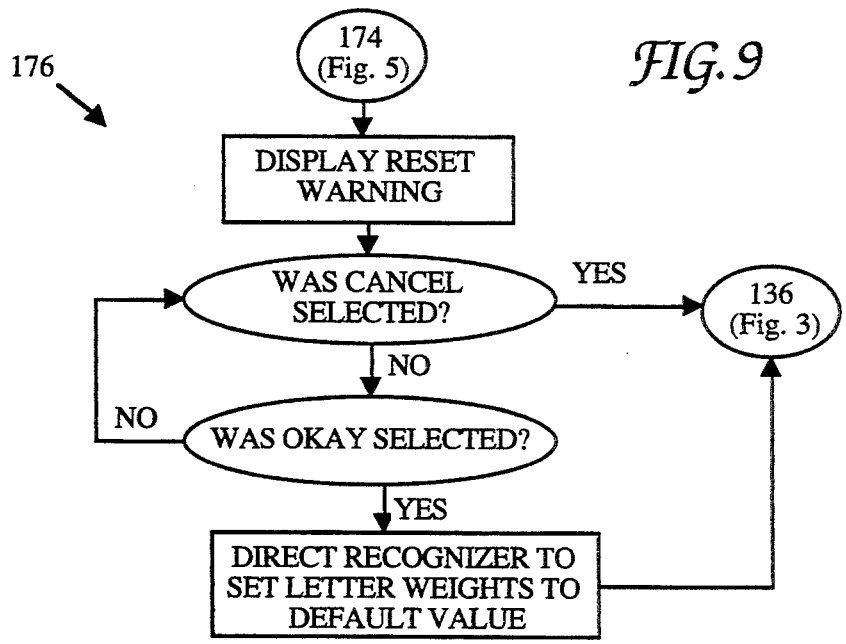
FIG. 9 is a flow diagram illustrating a process for a reset selection (step 176 of FIG. 5).

The processing of a reset selection (step 176 of FIG. 5) is presented in the flow diagram of FIG. 9. The logic begins in step 220 with the displaying of a warning that the reset button has been selected, which allows the user to cancel or confirm the selection. The next step 222 determines if the cancel option of the warning was selected. If it was, then the selection of the reset button is canceled and the process returns to step 136. If the selection was not canceled, then in step 224, the logic continues by determining whether the selection was confirmed, such as by the selection of an "okay" button within the warning window. If it was not selected, then the reset selection has not been confirmed or denied and the logic returns to step 222. If the "okay" button is selected, then the logic proceeds to step 226 in which the recognizer is directed to set all the probability weights for all of the character styles to their default value. This causes all of the "learning" performed by the recognizer to be undone, as previously described. The process then returns to step 136 to determine if the preference setting is completed.

Although only one embodiment of the present invention has been described in detail, it should be understood that the present invention may be embodied in many other specific forms without departing from the spirit or scope of the invention. Particularly, the invention has been described in the context of a recognizer "database" of information concerning a set of character styles and their associated probability of occurring. Of course, the invention is equally applicable to other "databases" of information. Alternatively, although the embodiment illustrated uses alphanumeric characters of the English language, the invention is capable of use with other languages as well. Further, the processing of a probability selection has been described in terms of two probability levels but is applicable to systems with multi-levels as well. Therefore, the present examples are to be considered as illustrative and not restrictive, and the invention is not to be limited to the details given herein, but may be modified within the scope of the appended claims.

What is claimed is:

1. A method for indicating preferred character handwriting styles in a pen-based computer system that includes an input screen, a stylus for engaging the screen to input handwritten text to the computer system, and a recognizer for recognizing handwritten text, the method comprising the steps of:
    activating a character style preference editor;
    displaying a plurality of variant character styles for a selected character, each variant character style representing a distinct style of writing the selected character that is recognizable by the recognizer; and
    receiving inputs indicative of the likelihood that a handwritten character input with the stylus will have a form analogous to a selected variant character style and setting a use probability factor associated with the selected variant character style in accordance with the input.

2. A method as recited in claim 1 further including displaying a recognized character style area, a probability selection area, a character index area, and a control bar area.

3. A method as recited in claim 1 further including processing inputs made to said character style preference editor.

4. A method as recited in claim 3 wherein said step of processing inputs further comprises determining whether an input has been made to select a variant group, wherein when said input has been made, said selection of said variant group is processed.

5. A method as recited in claim 3 wherein said step of processing inputs further comprises determining whether a character from a character index has been selected, wherein when a character has been selected, said character selection is processed.

6. A method as recited in claim 1 wherein said step of receiving inputs further comprises determining whether a probability weight has been selected, wherein when said probability weight has been selected, said probability weight selection is processed.

7. A method as recited in claim 3 wherein said step of processing inputs further comprises determining whether a reset selection has been made, wherein when said reset has been selected, said reset selection is processed.

8. A method as recited in claim 2 wherein said step of displaying a recognized character style area further comprises the substeps of:
    determining the number of variants associated with a particular character;
    determining the number of character spaces within the recognized character style area;
    defining a first character space position; and
    positioning a first variant group within said first character space position.

9. A method as recited in claim 8 wherein said step of positioning further comprises the substeps of:
    determining a probability weight associated with a first variant group;
    shading said first variant group in said first character space position in accordance with said probability weight;
    defining a next character space position; and
    positioning a next variant group within said next character space position.

10. A method as recited in claim 9 wherein said step of positioning is performed for each variant group.

11. A method as recited in claim 10 wherein after all of the variant groups are positioned, said method further comprises highlighting a selected variant group, updating a feedback string, highlighting a character in said character index, and highlighting a probability weight associated with said selected variant group.

12. A method as recited in claim 4 wherein said processing of said variant group selection further comprises the substeps of:
   determining which variant group has been selected;
   determining whether said selected variant group is different from a currently selected variant group, wherein when said selected variant group is different, said selected variant group is highlighted and said currently selected variant group is unhighlighted;
   redrawing a selected variant within said selected variant group slowly; and
   updating a probability weight associated with said selected variant group.

13. A method as recited in claim 5 wherein said processing of said character selection from said character index further comprises the substeps of:
   determining which character has been selected;
   determining the number of variant groups associated with a particular character;
   determining the number of character spaces comprising the recognized character style area;
   defining a first character space position; and
   positioning a first variant group within said first character space position.

14. A method as recited in claim 13 wherein said step of positioning a first variant group further comprises the substeps of:
   determining a probability weight associated with a first variant group;
   shading said first variant group in said first character space position in accordance with said probability weight;
   defining a next character space position; and
   positioning a next variant group within said next character space position.

15. A method as recited in claim 13 wherein said step of positioning is performed for each variant group.

16. A method as recited in claim 15 wherein when each variant group is positioned, said method further comprises highlighting a selected variant group, updating a feedback string, highlighting a character in said character index, and highlighting a probability weight associated with said selected variant group.

17. A method as recited in claim 6 wherein said step of processing said probability selection further comprises the substeps of
   determining what probability weight has been selected for a selected variant group; and
   determining whether the selected probability weight is the lowest probability weight;
   wherein when said selected probability weight is not the lowest, said selected variant group probability weight is set to said selected probability weight, said selected variant group is redrawn to reflect the set probability weight, and said selection is displayed.

18. A method as recited in claim 17 wherein when the selected probability weight is the lowest, said method further comprises determining if any other variant groups for the character style are set to a higher probability weight, wherein when there is a variant group of a higher probability, said selected variant group is set to the selected probability weight, said selected variant group is redrawn to reflect the set probability weight, and said selection is displayed.

19. A method as recited in claim 18 wherein when there is not a variant group of a higher probability, said selected variant group is set to a higher level of probability, said selected variant group is redrawn to reflect the set probability weight, and said selection is displayed.

20. A method as recited in claim 7 wherein said step of processing said reset selection further comprises the substeps of displaying a warning that said reset has been selected, determining whether said selection is confirmed, wherein when said reset selection is confirmed, probability weights for all character styles are reset to default values.

21. A method of displaying recognizable character handwriting styles in a pen-based computer system that includes an input table for receiving inputs, a display for displaying outputs, a stylus for engaging the screen to input handwritten text to the computer system, and a recognizer for recognizing handwritten text, the method comprising the steps of:
   displaying a plurality of distinct recognizable character styles for a selected character, each character style representing a distinct style of writing the selected character that is recognizable by the recognizer;
   receiving inputs indicative of the selection of a particular one of the character styles; and
   redrawing the selected character style in a stroke order associated with the selected character style at a speed that is discernible to a user to permit the user to view the stroke order associated with the selected character style.

22. A method as recited in claim 21 wherein said step of displaying further includes the substeps of:
   determining the number of variants associated with a particular character;
   determining the number of character spaces within the recognized character style area;
   defining a first character space position; and
   positioning a first variant group within said first character space position.

23. A method as recited in claim 22 further comprising the substeps of:
   determining a probability weight associated with a first variant group;
   shading said first variant group in said first character space position in accordance with said probability weight;
   defining a next character space position; and
   positioning a next variant group within said next character space position.

24. A method as recited in claim 23 wherein said step of positioning is performed for each variant group.

25. A method as recited in claim 23 wherein said step of shading said first variant group further comprises shading at a high level of shading for a highest probability level, at a medium level of shading for a medium probability level, and at a low level of shading for a probability level at a lowest level.

26. In a computer system that includes a display assembly for displaying outputs, an input tablet for receiving inputs, a stylus for engaging the input tablet to input handwritten text to the computer system, and a recognizer for recognizing handwritten text, a character style preference editor comprising:

means for activating a character style preference editor;

means for drawing a plurality of variant character styles for a selected character on the display assembly, wherein each variant character style represents a distinct style of writing the selected character that is recognizable by the recognizer; and means for setting a use probability factor associated with a selected variant character style in accordance with a user initiated input to the character style preference editor indicative of a desired probability setting, whereby the use probability factor is utilized by the recognizer when attempting to recognize handwritten text input to the computer system.

27. A computer system as recited in claim 26 wherein said means for drawing draws a recognized character style area, a probability selection area, a character index area, and a control bar area.

28. A computer system as recited in claim 26 further comprising a means for shading which shades said variant character styles with a shading in accordance with the desired probability setting.

29. A computer system as recited in claim 28 wherein said means for shading shades said variant character style with a high level of shading for a highest probability level, with a medium level of shading for a medium probability level, and with a low level of shading for a probability level at a lowest level.

30. A computer system as recited in claim 26 wherein said means for drawing redraws a selected variant character style at a speed discernible to a user, so as to demonstrate an order and form of strokes comprising the selected variant character style.

* * * * *